US012124747B2

(12) United States Patent
Morimoto et al.

(10) Patent No.: US 12,124,747 B2
(45) Date of Patent: Oct. 22, 2024

(54) ELECTRONIC EQUIPMENT, PROCESSING METHOD, AND NON-TRANSITORY COMPUTER-READABLE STORAGE MEDIUM STORING PROGRAM FOR DISPLAYING A DISPLAY SCREEN BASED ON USER INFORMATION

(71) Applicant: SEIKO EPSON CORPORATION, Tokyo (JP)

(72) Inventors: Keiichi Morimoto, Matsumoto (JP); Kota Nishida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/192,142

(22) Filed: Mar. 29, 2023

(65) Prior Publication Data
US 2023/0315357 A1    Oct. 5, 2023

(30) Foreign Application Priority Data
Mar. 31, 2022    (JP) ................................. 2022-058546

(51) Int. Cl.
*G06F 3/12*    (2006.01)
*G06F 1/3231*    (2019.01)
*G06F 3/048*    (2013.01)

(52) U.S. Cl.
CPC .......... *G06F 3/1224* (2013.01); *G06F 1/3231* (2013.01); *G06F 3/048* (2013.01); *G06F 3/1217* (2013.01)

(58) Field of Classification Search
None
See application file for complete search history.

(56) References Cited

U.S. PATENT DOCUMENTS

2012/0062937 A1\* 3/2012 Kirihara ............. H04N 1/00517
                                                                358/1.15
2018/0176404 A1    6/2018 Onishi

FOREIGN PATENT DOCUMENTS

| JP | 2016123038 A | * | 7/2016 | ......... H04N 1/00315 |
| JP | 2018-099816 A | | 6/2018 | |
| JP | 2021057638 A | * | 4/2021 | ......... G03G 21/1657 |
| WO | WO-2014125587 A1 | * | 8/2014 | ............. G06F 3/048 |

OTHER PUBLICATIONS

English translation of JP-2021-057638-A (Patents Application 2019-176272). (Year: 2021).\*
English translation of JP-2016123038-A (Patents Application 2014-263160). (Year: 2016).\*
English translation of WO-2014125587-A1. (Year: 2014).\*

\* cited by examiner

*Primary Examiner* — Thomas D Lee
(74) *Attorney, Agent, or Firm* — WORKMAN NYDEGGER

(57) ABSTRACT

Electronic equipment wirelessly communicates with a terminal apparatus through a wireless communication unit and includes a direction-information acquiring unit and a processor. The direction-information acquiring unit acquires, through wireless communication with the terminal apparatus by the wireless communication unit, direction information concerning a direction of the terminal apparatus with respect to a reference position of the electronic equipment. When determining based on the direction information that the terminal apparatus is located in a predetermined direction range, the processor performs processing for displaying, on a display, a display screen based on user information of a user of the terminal apparatus.

16 Claims, 16 Drawing Sheets

FIG. 6
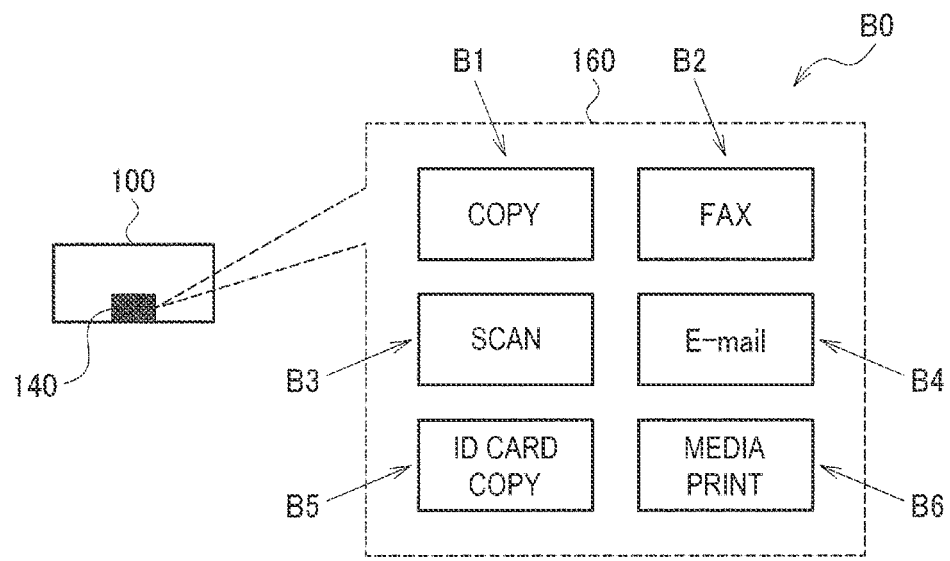
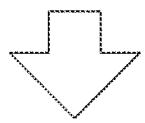
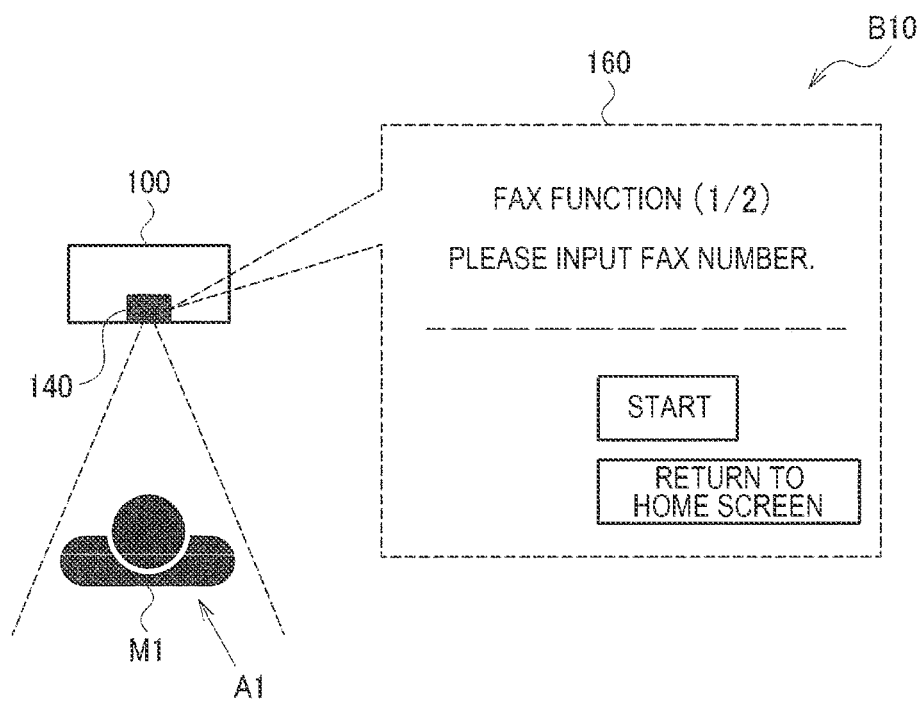

FIG. 7
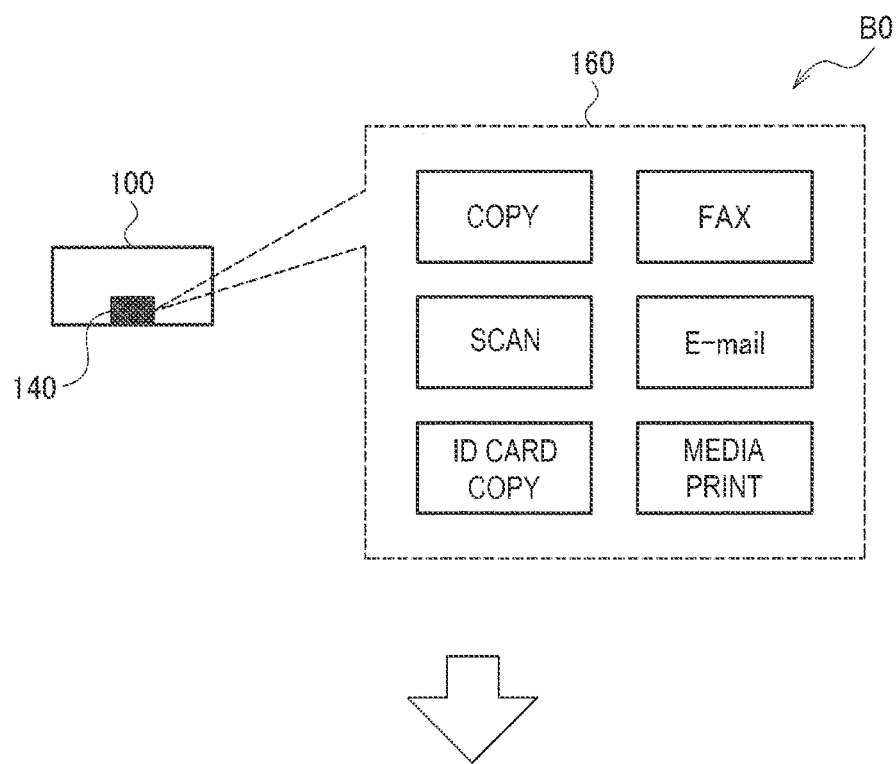
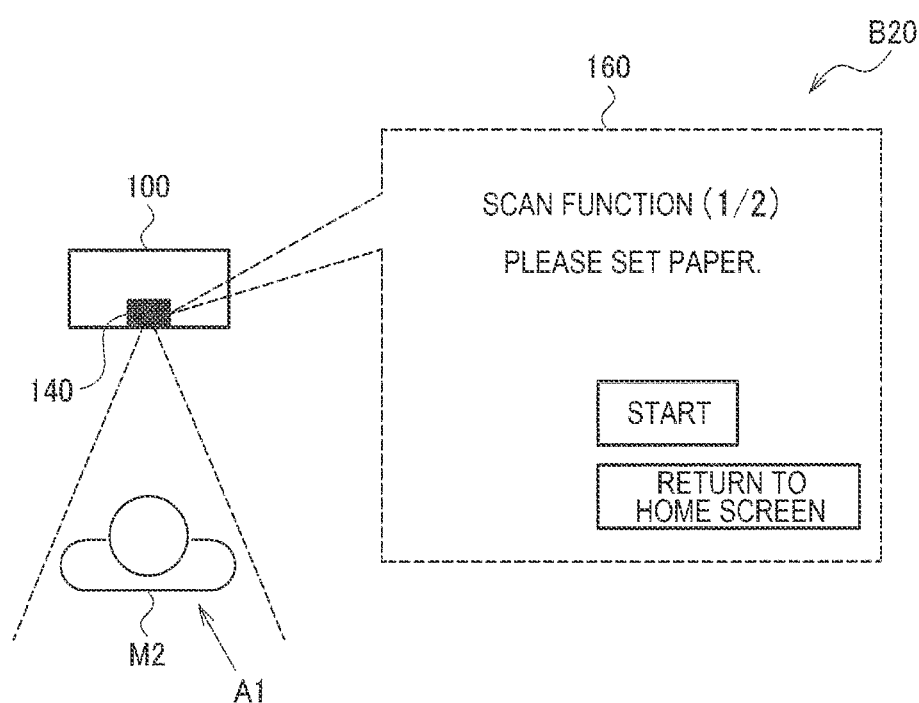

| DATE AND TIME INFORMATION | USER INFORMATION | FUNCTION |
|---|---|---|
| 2021/12/10 | M1 | FAX |
| 2021/12/11 | M2 | SCAN |
| 2021/12/12 | M1 | FAX |
| 2021/12/13 | M2 | SCAN |
| 2021/12/14 | M1 | FAX |
| ⋮ | ⋮ | ⋮ |

FIG. 14

| | | | | C20 |
|---|---|---|---|---|
| C21 | C22 | C23 | C24 | C25 |

| USER INFORMATION | FUNCTION | USE FREQUENCY | PRIORITY LEVEL | USE LAST |
|---|---|---|---|---|
| M1 | COPY | 25 TIMES/MONTH | 1 | – |
| | FAX | 25 TIMES/MONTH | 1 | O |
| | SCAN | 0 TIMES/MONTH | – | – |
| | E-mail | 0 TIMES/MONTH | – | – |
| | ID CARD COPY | 0 TIMES/MONTH | – | – |
| | MEDIA PRINT | 0 TIMES/MONTH | – | – |
| | ⋮ | ⋮ | ⋮ | ⋮ |
| M2 | COPY | 10 TIMES/MONTH | 2 | – |
| | FAX | 5 TIMES/MONTH | 3 | – |
| | SCAN | 20 TIMES/MONTH | 1 | O |
| | E-mail | 0 TIMES/MONTH | – | – |
| | ID CARD COPY | 0 TIMES/MONTH | – | – |
| | MEDIA PRINT | 0 TIMES/MONTH | – | – |
| | ⋮ | ⋮ | ⋮ | ⋮ |
| ⋮ | ⋮ | ⋮ | ⋮ | ⋮ |

FIG. 15

| USER INFORMATION | PERIOD | NUMBER OF TIMES OF USE | | | | | |
|---|---|---|---|---|---|---|---|
| | | COPY | FAX | SCAN | E-mail | ID CARD COPY | MEDIA PRINT |
| M1 | 9/1 TO 9/30 | 50 | 10 | 0 | 0 | 0 | 0 |
| | 10/1 TO 10/31 | 50 | 20 | 0 | 0 | 0 | 0 |
| | 11/1 TO 11/30 | 0 | 30 | 0 | 0 | 0 | 0 |
| | 12/1 TO 12/31 | 0 | 40 | 0 | 0 | 0 | 0 |

ELECTRONIC EQUIPMENT, PROCESSING METHOD, AND NON-TRANSITORY COMPUTER-READABLE STORAGE MEDIUM STORING PROGRAM FOR DISPLAYING A DISPLAY SCREEN BASED ON USER INFORMATION

The present application is based on, and claims priority from JP Application Serial Number 2022-058546, filed Mar. 31, 2022, the disclosure of which is hereby incorporated by reference herein in its entirety.

BACKGROUND

1. Technical Field

The present disclosure relates to electronic equipment, a processing method, a non-transitory computer-readable storage medium storing a program, and the like.

2. Related Art

There has been known electronic equipment having a plurality of functions. JP-A-2018-099816 (Patent Literature 1) discloses a method of displaying, based on a predetermined opportunity, a menu screen on which a plurality of functions are displayed as a list.

However, displaying the same menu screen uniformly to all users causes a burden on the users to select functions. Patent Literature 1 does not discloses a method of controlling display content on the menu screen using a direction detecting function of wireless communication.

SUMMARY

A first aspect of the present disclosure relates to electronic equipment that wirelessly communicates with a terminal apparatus through a wireless communication unit, the electronic equipment including: a direction-information acquiring unit configured to acquire, through the wireless communication with the terminal apparatus by the wireless communication unit, direction information concerning a direction of the terminal apparatus with respect to a reference position of the electronic equipment; and a processing unit configured to, when determining based on the direction information that the terminal apparatus is located in a predetermined direction range, perform processing for displaying, on a display unit, a display screen based on user information of a user of the terminal apparatus.

An aspect of the present disclosure relates to a processing method for performing: wireless communication processing for wirelessly communicating with a terminal apparatus; processing for acquiring, through the wireless communication processing, direction information concerning a direction of the terminal apparatus with respect to a reference position of electronic equipment; and processing for, when determining based on the direction information that the terminal apparatus is located in a predetermined direction range, performing processing for displaying, on a display unit, a display screen based on user information of a user of the terminal apparatus.

An aspect of the present disclosure relates to a non-transitory computer-readable storage medium storing a program for causing a computer to function as: a wireless communication unit configured to wirelessly communicate with a terminal apparatus; a direction-information acquiring unit configured to acquire, through the wireless communication with the terminal apparatus by the wireless communication unit, direction information concerning a direction of the terminal apparatus with respect to a reference position of electronic equipment; and a processing unit configured to, when determining based on the direction information that the terminal apparatus is located in a predetermined direction range, perform processing for displaying, on a display unit, a display screen based on user information of a user of the terminal apparatus.

BRIEF DESCRIPTION OF THE DRAWINGS

FIG. 6 is a diagram for explaining a display example to which a method in the embodiment is applied.

FIG. 7 is another diagram for explaining the display example to which the method in the embodiment is applied.

FIG. 14 is another diagram for explaining the use history information.

FIG. 15 is a diagram for explaining use period information.

DESCRIPTION OF EXEMPLARY EMBODIMENTS

An embodiment is explained below. The embodiment explained below does not unduly limit the content of the present disclosure described in the claims. Not all of components explained in the embodiment are essential constituent elements of the present disclosure.

Figure 1:
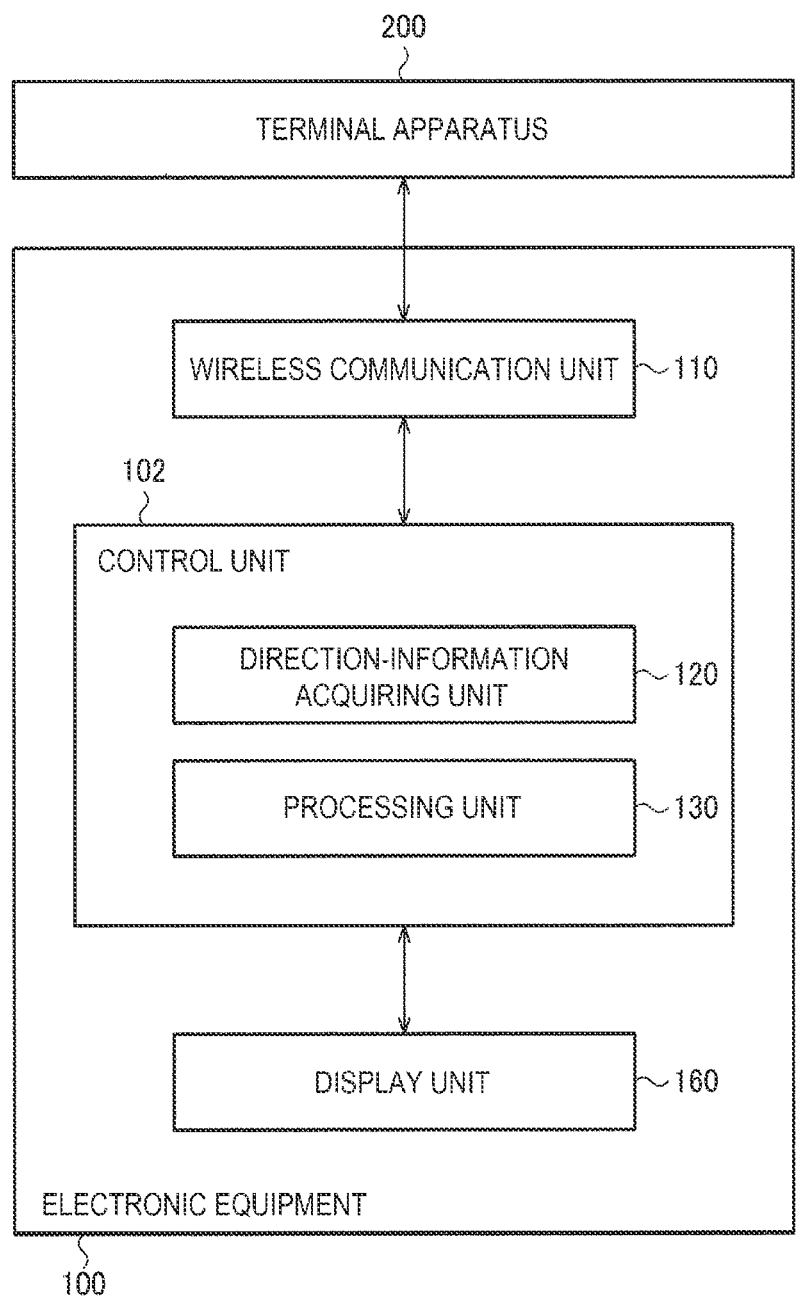
FIG. 1 is a diagram for explaining a configuration example and the like of electronic equipment.

FIG. 1 is a block diagram for explaining a configuration example of a system including electronic equipment 100 and a terminal apparatus 200 in this embodiment. The electronic equipment 100 includes a control unit 102, a wireless communication unit 110, and a display unit 160. The electronic equipment 100 performs wireless communication with the terminal apparatus 200 through the wireless communication unit 110. The electronic equipment 100 in this embodiment is not limited to the configuration illustrated in FIG. 1. Various modified implementations for, for example, omitting a part of constituent elements of the electronic equipment 100 and adding other constituent elements to the electronic equipment 100 are possible. Although not illustrated in FIG. 1, the other constituent elements are, for example, an operation unit 140 and a storage unit 150.

The electronic equipment 100 in this embodiment is, for example, a printer but may be a scanner, a personal computer, wearable equipment, biological information measurement equipment, a robot, video equipment, physical quantity measurement equipment, or the like. The wearable equipment refers to a smartwatch, an activity tracker, or the like. The biological information measurement equipment refers to a pulsimeter, a pedometer, or the like. The video equipment refers to a camera, a projector, or the like. The physical quantity measurement equipment refers to a thermometer, a weight meter, or the like. The printer referred to therein includes a multifunction peripheral. The multifunction peripheral refers to a printer including functions other than a printer function. The functions other than the printer function are a copy function, a FAX function, a scanner function, and the like but may be other functions. The terminal apparatus 200 is a portable information terminal such as a smartphone but may be the personal computer or the like described above. A configuration example of the system including the electronic equipment 100 and the terminal apparatus 200 in this embodiment is not limited to FIG. 1. For example, the electronic equipment 100 may wirelessly communicate with a plurality of terminal apparatuses 200. The terminal apparatus 200 may wirelessly communicate with a plurality of pieces of electronic equipment 100. The electronic equipment 100 in this embodiment can also wirelessly communicate with external equipment different from the terminal apparatus 200 illustrated in FIG. 1.

The wireless communication unit 110 is a communication interface that performs wireless communication conforming to a predetermined wireless communication standard. The wireless communication unit 110 can be realized by communication hardware such as a communication ASIC (Application Specific Integrated Circuit) or a communication processor, communication firmware, or the like. In this embodiment, a processing unit 130 explained below performs communication control processing such as information transmission processing and information reception processing on the wireless communication unit 110, whereby the wireless communication unit 110 can transmit information to an external apparatus such as the electronic equipment 10 and receive information from the external apparatus. There may be a plurality of kinds of predetermined wireless communication standards. That is, the wireless communication unit 110 includes communication hardware and communication firmware respectively corresponding to the predetermined wireless communication standards.

The wireless communication unit 110 can perform wireless communication conforming to a short range wireless communication standard such as Bluetooth (registered trademark) serving as the predetermined wireless communication standard. In this embodiment, Bluetooth includes BLE (Bluetooth Low Energy) and is sometimes simply described as BLE in the following explanation. That is, the wireless communication unit 110 of the electronic equipment 100 and the terminal apparatus 200 in this embodiment respectively include not-shown BLE communication units. Consequently, it is possible to perform communication by the BLE between the electronic equipment 100 and the terminal apparatus 200. It is assumed that the BLE communication units are adapted to standards of Bluetooth 5.1 and subsequent versions. In other words, the units included in the electronic equipment 100 and the terminal apparatus 200 in this embodiment are adapted to the standards of Bluetooth 5.1 and subsequent versions.

The wireless communication unit 110 may further perform wireless communication conforming to another wireless communication standard. The other wireless communication standard is, for example, Wi-Fi (registered trademark). That is, the wireless communication unit 110 may further perform wireless communication by a predetermined connection mode of the Wi-Fi. The predetermined connection mode is, for example, a Wi-Fi infrastructure mode, an ad-hoc mode, or a Wi-Fi Direct (registered trademark) mode but may be another connection mode. Wi-Fi Direct can also be referred to as direct connection. The respective predetermined connection modes can be optionally set to active or inactive.

The control unit 102 performs data input and output control between the control unit 102 and the functional units of the electronic equipment 100. For example, the control unit 102 executes various kinds of arithmetic processing and, for example, controls a display output operation to the display unit 160 based on a predetermined program read out from the storage unit 150 not illustrated in FIG. 1, an operation input signal received from the operation unit 140 not illustrated in FIG. 1, various data received via the wireless communication unit 110, or the like. The predetermined program is basic software such as an OS (Operating System), various application programs operating based on the basic software, both of the basic software and the various application programs, or the like.

The control unit 102 can be realized by a processor. That is, respective kinds of processing in this embodiment can be realized by a processor that operates based on information such as a program and the storage unit 150 not illustrated in FIG. 1 that stores the information such as the program. The processor may be, for example, individual pieces of hardware that realize functions of the units or integrated hardware that realizes the functions of the units. For example, the processor can include hardware and the hardware can include at least one of a circuit that processes a digital signal and a circuit that processes an analog signal. For example, the processor can also be configured by one or a plurality of circuit devices mounted on a circuit board or one or a plurality of circuit elements. The processor may be, for example, a CPU (Central Processing Unit). However, the processor is not limited to the CPU. Various processors such as a GPU (Graphics Processing Unit) or a DSP (Digital Signal Processor) can be used. The processor may be a hardware circuit by an ASIC. The processor may include an amplifier circuit, a filter circuit, or the like that processes an analog signal.

The control unit 102 in this embodiment includes a direction-information acquiring unit 120 and a processing unit 130. That is, the electronic equipment 100 in this embodiment includes the direction-information acquiring unit 120 and the processing unit 130. For example, the control unit 102 reads out a display control program explained below from the storage unit 150 not illustrated in FIG. 1 and executes the display control program to thereby perform functions of the direction-information acquiring unit 120 and the processing unit 130. In an operation of the display control program, when basic software for the display control program is necessary, the control unit 102 may read out a program of the basic software from the storage unit 150 not illustrated in FIG. 1 and perform the function of the processing unit 130.

The direction-information acquiring unit 120 acquires, through the wireless communication with the terminal apparatus 200 by the wireless communication unit 110, direction information concerning a direction of the terminal apparatus 200 with respect to a reference position of the electronic equipment 100. The acquisition of the direction information can be realized by, for example, a method explained below. For example, it is assumed that the BLE communication unit of the terminal apparatus 200 broadcasts an advertise packet of the BLE and the BLE communication unit of the wireless communication unit 110 that receives the advertise packet includes a plurality of reception antennas. At this time, since the advertise packet reaches the respective reception antennas with time differences, an angle of arrival AOA of a radio wave can be estimated based on a first calculation method using known distances among the respective antennas and the wavelength of the radio wave. That is, although not illustrated, the reference position of the electronic equipment 100 is, for example, a position where the antennas of the BLE communication unit of the wireless communication unit 110 are located. It does not matter where in the electronic equipment 100 the reference position is located. Since a method of estimating the angle of arrival AOA including the first calculation method is publicly known, detailed explanation of the method is omitted.

The acquisition of the direction information may be realized by, for example, a method explained below. The BLE communication unit of the terminal apparatus 200 includes a plurality of transmission antennas and broadcasts an advertise packet of the BLE while shifting timing for transmitting radio waves from the respective transmission antennas. It is assumed that, at this time, the advertise packet includes information concerning timings when the respective transmission antennas transmit the advertise packet and distance information among the respective transmission antennas. The BLE communication unit of the wireless communication unit 110 can estimate an angle of departure AOD of a radio wave based on a second calculation method using a phase difference of the advertise packet received from the respective transmission antennas and the information concerning the transmission timings and the distance information among the transmission antennas included in the advertise packet. Since a method of estimating the angle of departure AOD including the second calculation method is publicly known, detailed explanation of the method is omitted.

The processing unit 130 performs the function of the display control program explained above and performs processing explained below with reference to FIG. 2 and the like. For example, when determining that the terminal apparatus 200 is located in the predetermined direction range, the processing unit 130 performs screen display processing corresponding to user information included in a beacon signal. The user information included in the beacon signal is, for example, information stored in a payload of a protocol data unit in an advertise packet of the beacon signal. Details of the user information are explained below. For example, at timing when the direction-information acquiring unit 120 acquires direction information with an advertise packet of the BLE broadcasted by the BLE communication unit of the terminal apparatus 200, the processing unit 130 acquires the user information based on the advertise packet. The processing unit 130 may perform a function of basic software or the like for the display control program. The function of the basic software or the like is, for example, a function of converting orientation information acquired based on, for example, a not-shown geomagnetism sensor or gyro sensor into information used in respective kinds of processing of the display control program explained below. In this embodiment, other information may be further included in the payload. The other information is, for example, information concerning radio wave intensity. Details of the other information are explained below.

The display unit 160 is configured by a display or the like that displays various kinds of information to a user. The display unit 160 can be realized by, for example, a liquid crystal display but may be realized by an organic EL display, a dot matrix LED, or the like. The operation unit 140 and the display unit 160 not illustrated in FIG. 1 may be formed as integral hardware by, for example, a touch panel. For example, although not illustrated because of being publicly known, when the electronic equipment 100 is turned on and a boot program starts, a menu screen is displayed on the display unit 160. The menu screen is, for example, a screen for the user to perform setting for the electronic equipment 100, selection of functions, and the like and can also be referred to as top screen, top menu screen, or the like.

Figure 2:
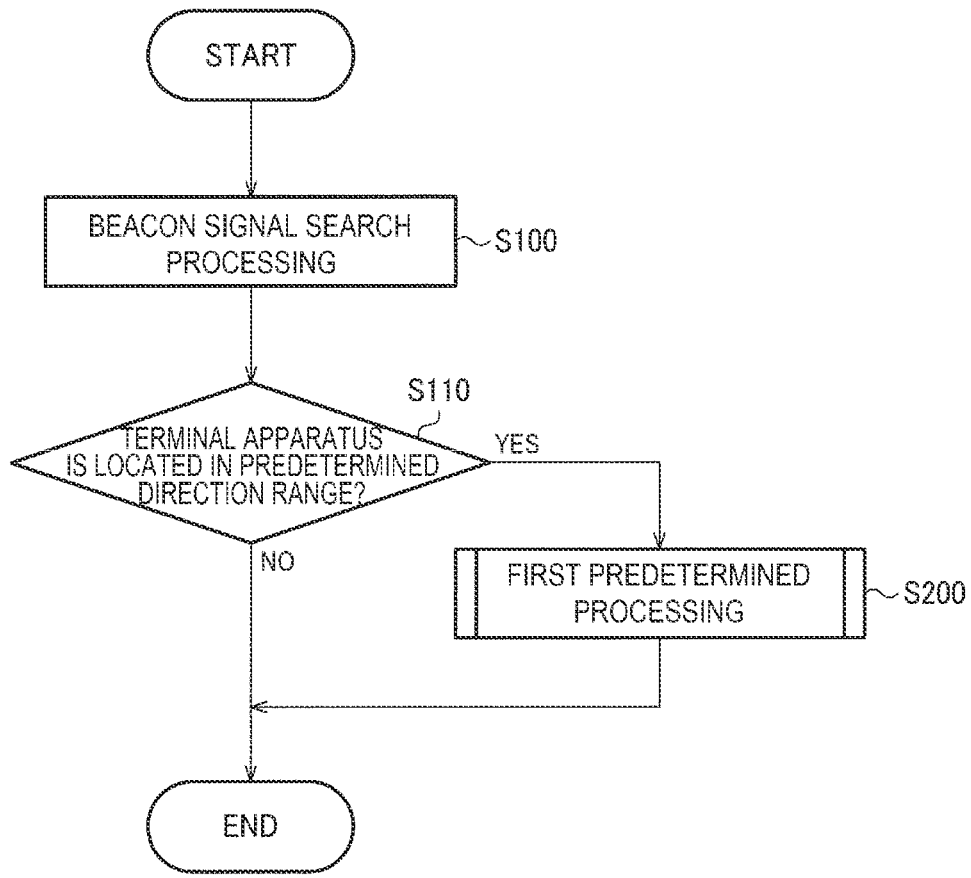
FIG. 2 is a flowchart for explaining a processing example in an embodiment.

FIG. 2 is a flowchart for explaining a processing example of the display control program in this embodiment. Processing illustrated in FIG. 2 is illustrated as, for example, timer interruption processing performed at every fixed time but may be loop processing after the boot program of the electronic equipment 100 starts. The processing unit 130 performs beacon signal search processing (step S100). For example, as explained above, the BLE communication unit of the terminal apparatus 200 broadcasts an advertise packet of the BLE and the BLE communication unit of the electronic equipment 100 performs scanning processing. In other words, the BLE communication unit of the electronic equipment 100 does not broadcast the advertise packet of the BLE.

The processing unit 130 performs processing for determining whether the terminal apparatus 200 is located in the predetermined direction range (step S110). For example, although not illustrated, it is assumed that the electronic equipment 100 to which the user always approaches in a predetermined direction because of a predetermined reason is present. The predetermined reason is that, for example, the electronic equipment 100 is disposed at a corner of a predetermined floor or walls or other equipment are disposed in directions other than the predetermined direction. It is assumed that the user of the electronic equipment 100 always carries the terminal apparatus 200. The direction-information acquiring unit 120 acquires direction information based on the advertise packet of the BLE broadcasted by the BLE communication unit of the terminal apparatus 200. The processing unit 130 performs processing for determining whether a direction based on the direction information is the same as a direction within the predetermined direction range. "The same" includes "substantially the same".

When determining that the terminal apparatus 200 is located in the predetermined direction range (YES in step S110), the processing unit 130 performs first predetermined processing (step S200) and ends a flow. For example, in an office where role allocation is clearly divided, functions of the electronic equipment 100 used by users are sometimes determined for each of the users. Therefore, as the first predetermined processing (step S200), the processing unit 130 performs processing for acquiring user information for identifying a user based on the advertise packet of the BLE broadcasted by the BLE communication unit of the terminal apparatus 200 and processing for changing the menu screen based on a first predetermined table in which the user information and functions to be used by the user are correlated. It is assumed that the first predetermined table is stored in advance in the storage unit 150 not illustrated in FIG. 1 based on, for example, the role allocation of the users in the office. Consequently, for example, when a user associated with the FAX function is located in the predetermined direction range, the processing unit 130 performs, according to the flow of FIG. 2, processing for changing a screen displayed on the display unit 160 from the menu screen to a screen dedicated to the FAX function. The first predetermined processing (step S200) is not limited to the processing explained above and may be other processing. Details of the first predetermined processing are explained below. On the other hand, when determining that the terminal apparatus 200 is not located in the predetermined direction range (NO in step S110), the processing unit 130 ends the flow.

As explained above, the electronic equipment 100 in this embodiment wirelessly communicates with the terminal apparatus 200 through the wireless communication unit 110 and includes the direction-information acquiring unit 120 and the processing unit 130. The direction-information acquiring unit 120 acquires, through the wireless communication with the terminal apparatus 200 by the wireless communication unit 110, direction information concerning a direction of the terminal apparatus 200 with respect to the reference position of the electronic equipment 100. When determining based on the direction information that the terminal apparatus 200 is located in the predetermined direction range, the processing unit 130 performs processing for displaying, on the display unit 160, a display screen based on user information of a user of the terminal apparatus 200. Since the electronic equipment 100 in this embodiment includes the wireless communication unit 110 and the direction-information acquiring unit 120 in this way, the electronic equipment 100 can acquire direction information based on a wireless communication radio wave broadcasted by the terminal apparatus 200. Since the electronic equipment 100 in this embodiment includes the processing unit 130, when the terminal apparatus 200 is located in the predetermined direction range, the electronic equipment 100 can display, on the display unit 160, the display screen based on the user information. Consequently, it is possible to improve convenience of the electronic equipment 100. For example, when the user associated with the FAX function as explained above reaches the front of the display unit 160, the user can view not the menu screen but the screen dedicated to the FAX function. Therefore, the user can immediately use the FAX function of the electronic equipment 100. The electronic equipment 100 that displays the display screen based on the user information when determining based on the direction information that the terminal apparatus 200 is located in the predetermined direction range has not been proposed.

The method in this embodiment may be realized as a processing method. That is, the processing method in this embodiment performs wireless communication processing for wirelessly communicating with the terminal apparatus 200 and processing for acquiring, with the wireless communication processing, direction information concerning a direction of the terminal apparatus 200 with respect to the reference position of the electronic equipment 100. The processing method in this embodiment further performs processing for, when determining based on the direction information that the terminal apparatus 200 is located in the predetermined direction range, displaying, on the display unit 160, a display screen based on user information of the user of the terminal apparatus 200. Accordingly, it is possible to obtain the same effects as the effects explained above.

The method in this embodiment may be realized as a program. That is, the program in this embodiment causes a computer to function as the wireless communication unit 110 that wirelessly communicates with the terminal apparatus 200, the direction-information acquiring unit 120, and the processing unit 130. The direction-information acquiring unit 120 acquires, through the wireless communication with the terminal apparatus 200 by the wireless communication unit 110, direction information concerning a direction of the terminal apparatus 200 with respect to the reference position of the electronic equipment 100. When determining based on the direction information that the terminal apparatus 200 is located in the predetermined direction range, the processing unit 130 performs processing for displaying, on the display unit 160, a display screen based on the user information of the user of the terminal apparatus 200. Consequently, the same effects as the effects explained above can be obtained.

The method in this embodiment is not limited to the above explanation. Various modified implementations are possible. In the following explanation of modifications, the Bluetooth standard is illustrated as a representative of a wireless communication standard. That is, in the electronic equipment 100 in this embodiment, the direction-information acquiring unit 120 acquires direction information based on wireless communication conforming to the Bluetooth standard. Consequently, it is possible to construct a system that controls display of the electronic equipment 100 using the Bluetooth.

For example, in the electronic equipment 100 in this embodiment, the reference position may be a position that can be checked from the outside of the electronic equipment 100. Specifically, for example, wireless communication hardware functioning as the wireless communication unit 110 may be installed, through a mounting process, on a touch panel or a substrate including operation buttons functioning as the operation unit 140 of the electronic equipment 100. Consequently, the position of the wireless communication unit 110 and the position of the operation unit 140 are made common. The user can grasp the position of the wireless communication unit 110 from the outside of the electronic equipment 100. The operation unit 140 may be provided in the front direction of the electronic equipment 100. The front direction of the electronic equipment 100 is a direction from the electronic equipment 100 toward a position where the user is assumed to be normally located when using the electronic equipment 100. That is, as indicated by A1 in FIG. 3, a direction range of a predetermined angle α including the front direction may be set as the predetermined direction range based on a not-shown antenna included in the BLE communication unit of the wireless communication unit 110. Therefore, in the electronic equipment 100 in this embodiment, the reference position is the position of the operation unit 140 and the predetermined direction range is the direction range including the front direction from the operation unit 140. Accordingly, the processing unit 130 can perform processing for displaying, based on the direction information based on the front side of the operation unit 140, the display screen based on the user information on the display unit 160. Consequently, the processing unit 130 can execute display processing in an appropriate situation. For example, the user and the terminal apparatus 200 being located in the direction range including the front direction of the electronic equipment 100 is an appropriate situation because the user is considered to have an intention of using the electronic equipment 100. On the other hand, performing the display processing when the user and the terminal apparatus 200 are located in a direction opposite to the operation unit 140 is considered to be not an appropriate situation.

Figure 4:
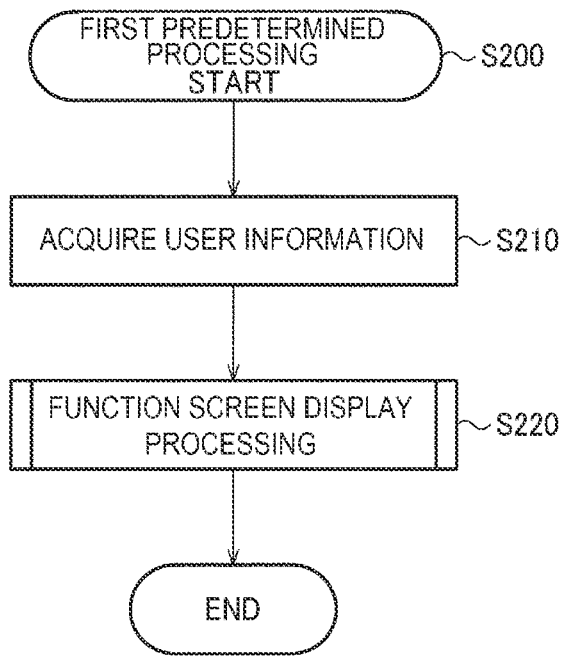
FIG. 4 is a flowchart for explaining a processing example of first predetermined processing.

The first predetermined processing (step S200) may be performed like, for example, a processing example illustrated in a flowchart of FIG. 4. First, the processing unit 130 performs processing for acquiring user information (step S210). As explained above, the user information is included in the payload of the advertise packet of the BLE broadcasted by the BLE communication unit of the terminal apparatus 200. The processing unit 130 acquires the user information included in the advertise packet via the BLE communication unit of the electronic equipment 100. The user information is, for example, a user ID but may be other identification information if the other identification information can uniquely identify the user. The other identification information is identification information of the terminal apparatus 200 such as an MAC address of the terminal apparatus 200. For example, the first predetermined table explained above is a table in which functions to be used by users and user IDs of the users are associated. However, not only this, but the first predetermined table may be a table in which the functions to be used by the users, the user IDs, and the other identification information are respectively associated. The first predetermined table may be a table in which the functions to be used by the users and the other identification information are associated and a second predetermined table may be a table in which the other identification information and the user IDs are associated. That is, in the electronic equipment 100 in this embodiment, the user information is at least one of the identification information of the terminal apparatus 200 and the user ID. Accordingly, it is possible to appropriately specify a user corresponding to a display screen that should be displayed on the display unit 160. Thereafter, the processing unit 130 performs function screen display processing (step S220).

Figure 5:
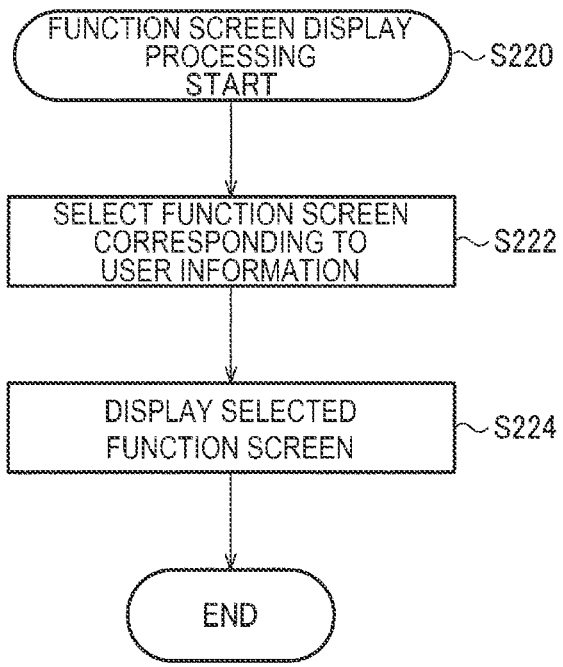
FIG. 5 is a flowchart for explaining a processing example of function screen display processing.

The function screen display processing (step S220) is explained in detail with reference to a flowchart of FIG. 5. The processing unit 130 performs processing for selecting a function screen corresponding to the user information (step S222). By performing processing for collating the user ID included in the advertise packet broadcasted by the terminal apparatus 200 and the first predetermined table, the processing unit 130 can specify a function to be used by the user. When the other identification information explained above is included in the advertise packet, a table in which functions to be used by the user and the other identification information are associated only has to be set as the first predetermined table. The processing unit 130 may perform processing for predicting and selecting a function corresponding to the user information. Details of the processing are explained below.

Figure 16:
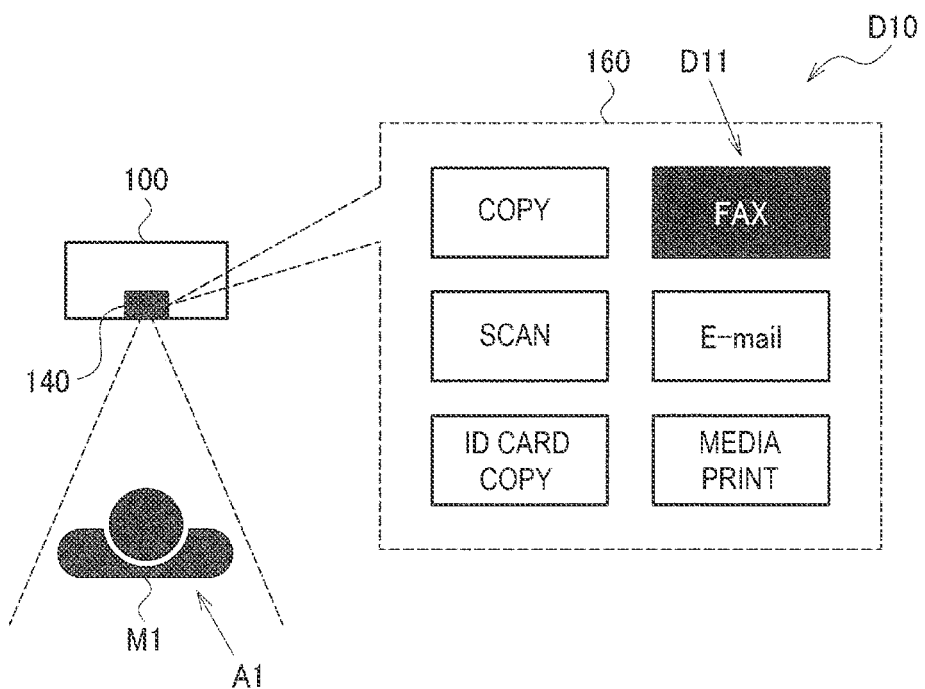
FIG. 16 is a diagram for explaining another display example to which the method in the embodiment is applied.

Thereafter, the processing unit 130 performs processing for displaying the selected function screen (step S224). For example, the processing unit 130 performs processing for displaying a function screen that is a screen different from an initial menu screen. However, not only this, but the processing unit 130 may perform, for example, processing for changing a form of the initial menu screen. Details of the processing are explained below with reference to FIG. 16 and the like. The initial menu screen is a screen displayed first on the display unit 160 after the electronic equipment 100 is turned on and the execution of the boot program is completed. The initial menu screen is displayed such that the user is capable of recognizing that the electronic equipment 100 has, for example, a FAX function. However, a function of the electronic equipment 100 is not limited to the FAX function and may be for example, a scan function, may be a copy function, or may be a printing function. The printing function referred to herein is, for example, a function of executing printing based on a printing job stored in a predetermined medium connected to a not-shown interface but may be, for example, a function of executing printing based on a printing job supplied through a network. That is, functions of the electronic equipment 100 in this embodiment include at least one of the printing function, the FAX function, the scan function, and the copy function. Accordingly, the user can use at least one of the printing function, the FAX function, the scan function, and the copy function of the electronic equipment 100.

For example, when the electronic equipment 100 has a plurality of functions, as the initial menu screen, the functions of the electronic equipment 100 may be displayed as a list. The functions of the electronic equipment 100 are specifically explained with reference to FIGS. 6, 7, and 8. For example, as indicated by B0 in FIG. 6, an icon B1 indicating the copy function, an icon B2 indicating the FAX function, an icon B3 indicating the scan function, an icon B4 indicating an electronic mail, an icon B5 indicating ID card copy, and an icon B6 indicating medium print are displayed on the display unit 160. The user can use a function selected by selecting any one of the icons B1 to B6. In other words, at a stage when the initial menu screen indicated by B0 is displayed, the user can use none of the functions indicated by B1 to B6 and needs to perform work for selecting any one of the icons. In particular, when the electronic equipment 100 has a large number of functions, since many icons are displayed on the display unit 160, the user needs time for searching for an icon indicating a desired function. The screen indicated by B0 in FIG. 6 is an illustration and does not prevent further display of icons indicating other functions.

Figure 3:
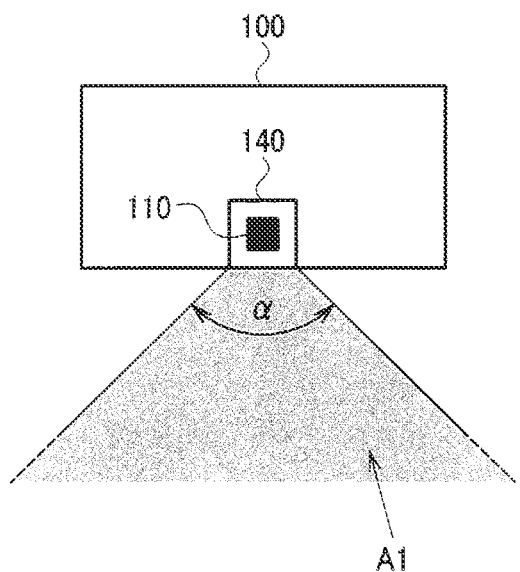
FIG. 3 is a diagram for explaining an example of a predetermined direction range.

In that regard, by applying the method in this embodiment, for example, as illustrated in FIG. 6, when a first user M1 desiring to use the FAX function is located in the direction range indicated by A1 as in FIG. 3, the processing unit 130 performs processing for changing the screen indicated by B0 to a screen indicated by B10. The screen indicated by B10 is an example of a screen displayed first when the FAX function is actually used. The screen indicated by B10 is displayed when the icon B2 is selected on the screen indicated by B0. That is, the processing unit 130 periodically performs step S100 in FIG. 4 and, when the first user M1 is located in the predetermined direction range at certain timing, determines YES in step S110. Since the processing unit 130 performs the first predetermined processing (step S200), the screen indicated by B10 is displayed on the display unit 160 even if the first user M1 does not perform work for selecting the icon B2.

Similarly, for example, as illustrated in FIG. 7, when a second user M2 desiring to use the scan function is located in the direction range indicated by A1, the processing unit 130 performs processing for changing the screen indicated by B0 to a screen indicated by B20. The screen indicated by B20 is an example of a screen displayed first when the scan function is actually used. The screen indicated by B20 is displayed when the icon B3 is selected on the screen indicated by B0. That is, when the second user M2 is located in the predetermined direction range, according to the same processing as the processing explained above, the screen indicated by B20 is displayed on the display unit 160 even if the second user M2 does not perform work for selecting the icon B3. When the electronic equipment 100 in this embodiment has a plurality of functions in this way, the processing unit 130 performs processing for displaying, on the display unit 160, as a display screen, a function screen corresponding to user information among function screens corresponding to the plurality of functions. Accordingly, when the electronic equipment 100 has the plurality of functions, the user can view a desired display screen different from the menu screen.

Figure 8:
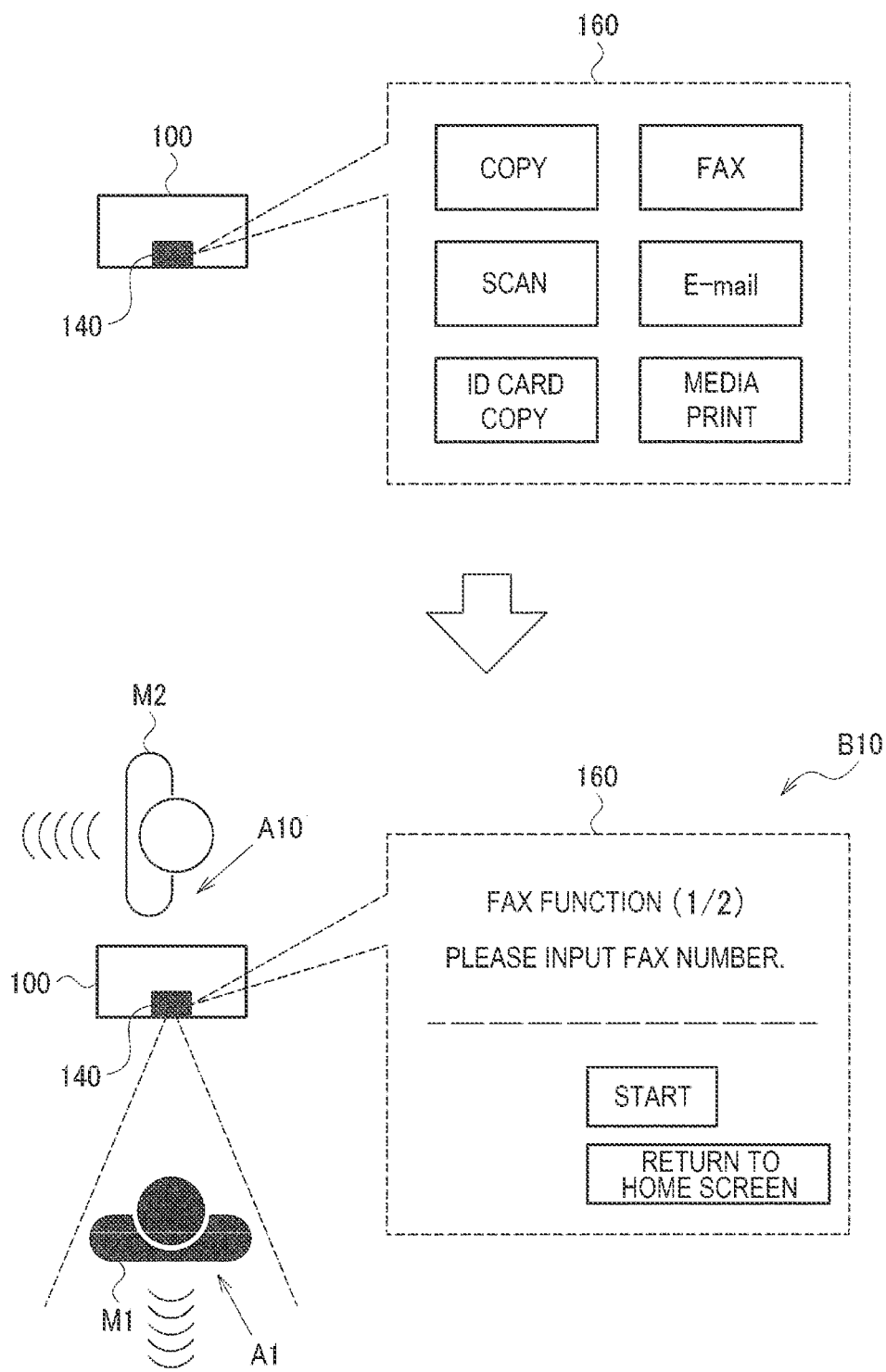
FIG. 8 is another diagram for explaining the display example to which the method in the embodiment is applied.

For example, as illustrated in FIG. 8, it is assumed that there is a situation in which the first user M1 is located in the position indicated by A1 and the second user M2 is located in a position indicated by A10. If the processing unit 130 performs processing for displaying, based on only reception of a beacon signal of the terminal apparatus 200, a display screen based on the user information of the terminal apparatus 200, it could occur that the processing unit 130 performs processing for displaying a display screen based on the user information based on the beacon signal received from the terminal apparatus 200 of the second user M2. As a result, although not illustrated, the first user M1 standing in the position in front of the electronic equipment 100 views a screen of the scan function. Therefore, the convenience of the electronic equipment 100 is spoiled. In that regard, by applying the method in this embodiment, the processing unit 130 performs processing for displaying the screen indicated by B10 in the same manner as illustrated in FIG. 6 in order to perform processing for displaying a display screen based on user information of the first user M1 located in the predetermined direction range. Consequently, the processing unit 130 can appropriately specify the terminal apparatus 200 of a user desiring to use the electronic equipment 100 and perform processing for displaying a suitable display screen. Consequently, it is possible to improve the convenience of the electronic equipment 100.

Figure 9:
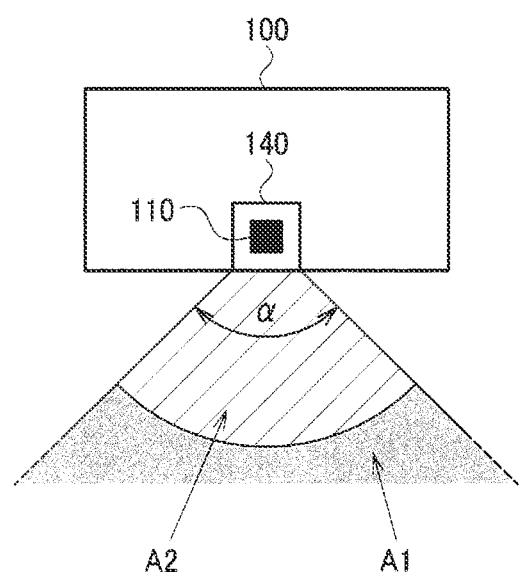
FIG. 9 is a diagram for explaining another example of the predetermined direction range.

The processing example using the predetermined direction range or the like based on the direction information is explained above. However, the method in this embodiment is not limited to the processing example and may be a processing example further considering information concerning a distance. For example, as indicated by A2 in FIG. 9, the direction range indicated by A1 in FIG. 3 and a range of a predetermined distance from the reference position may be set as the predetermined direction range. The processing unit 130 can acquire information concerning a distance, for example, with a method explained below and set the information as the predetermined direction range. When the BLE communication unit of the wireless communication unit 110 is receiving a radio wave based on the BLE, since an advertise packet of the BLE includes reference radio wave intensity information, the processing unit 130 can acquire information concerning the distance between the terminal apparatus 200 and the electronic equipment 100. Reference radio wave intensity is received signal intensity (RSSI: Received Signal Strength Indication) of a beacon signal in reception side equipment at the time when the reception side equipment is installed in a position separated from transmission side equipment of the beacon signal by a reference distance. Since radio wave intensity is inversely proportional to a square of a distance, if radio wave intensity at the reference distance is known, the processing unit 130 can calculate information or the like concerning the distance between the terminal apparatus 200 and the electronic equipment 100 based on radio wave intensity of a beacon signal of the BLE actually received by the BLE communication unit. The information or the like concerning the distance between the terminal apparatus 200 and the electronic equipment 100 is a specific distance such as "1.5 m" but may be, for example, information that can distinguish the predetermined direction range and a range other than the predetermined direction range. As explained above, in the electronic equipment 100 in this embodiment, when the terminal apparatus 200 is located in the predetermined direction range and a predetermined distance range that is a range of a predetermined distance, the processing unit 130 performs processing for displaying the display screen based on the user information on the display unit 160. Accordingly, it is possible to set the predetermined direction range in a more appropriate range. Consequently, the processing unit 130 can appropriately recognize a user desiring to use the electronic equipment 100 and the terminal apparatus 200 carried by the user. For example, the terminal apparatus 200 located in a position far from the reference position in the range indicated by A1 explained above is highly likely to be the terminal apparatus 200 of a user accidentally located in the range in indicated by A1 but actually not desiring to use the electronic equipment 100. In that regard, by applying the method in this embodiment, the processing unit 130 can exclude, from targets of step S110 explained above, the terminal apparatus 200 of the user actually not desiring to use the electronic equipment 100. Consequently, the processing unit 130 can perform more appropriate display processing.

It is assumed that, for example, there is a case in which, when the processing unit 130 performs the beacon signal search processing (step S100) in FIG. 2, a plurality of terminal apparatuses 200 are located in the predetermined direction range. In this case, the processing unit 130 may perform, for example, the first predetermined processing (step S200) on the terminal apparatus 200 that broadcasts a beacon signal having the highest radio wave intensity among beacon signals received by the BLE communication unit of the electronic equipment 100. In other words, the processing unit 130 may perform, for example, the first predetermined processing (step S200) on the terminal apparatus 200 closest from the reference position among the electronic equipment 100 located in the predetermined direction range. This is because it is appropriate to display, to a user closest from the reference position, a function screen considered to be used by the user. In this way, in the electronic equipment 100 in this embodiment, when determining that the terminal apparatus 200 and another terminal apparatus 200 are located in the predetermined direction range, the processing unit 130 performs processing for displaying, on the display unit 160, the display screen based on the user information of the terminal apparatus 200 closer to the electronic equipment 100. Accordingly, when a plurality of terminal apparatuses 200 are located in the predetermined direction range, the processing unit 130 can display an appropriate function screen.

Figure 10:
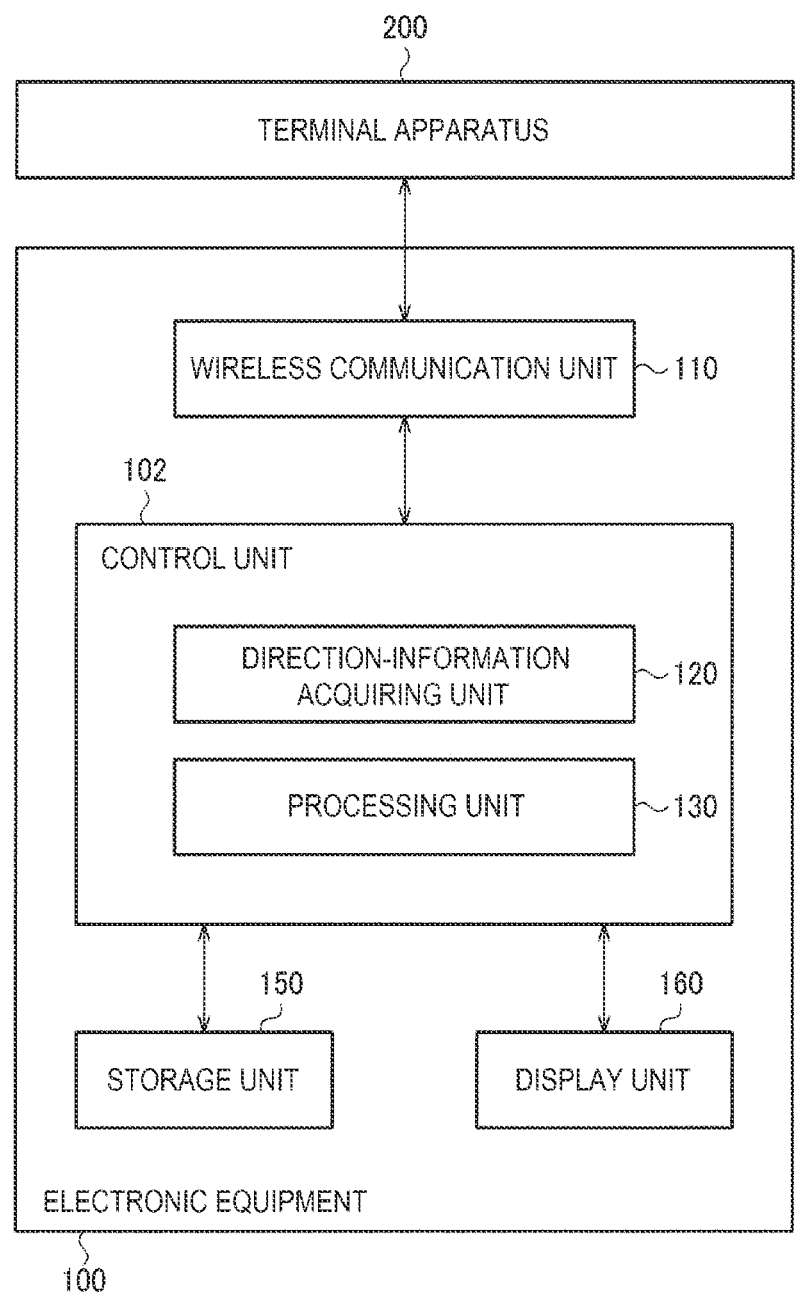
FIG. 10 is a diagram for explaining another configuration example and the like of the electronic equipment.
Figure 11:
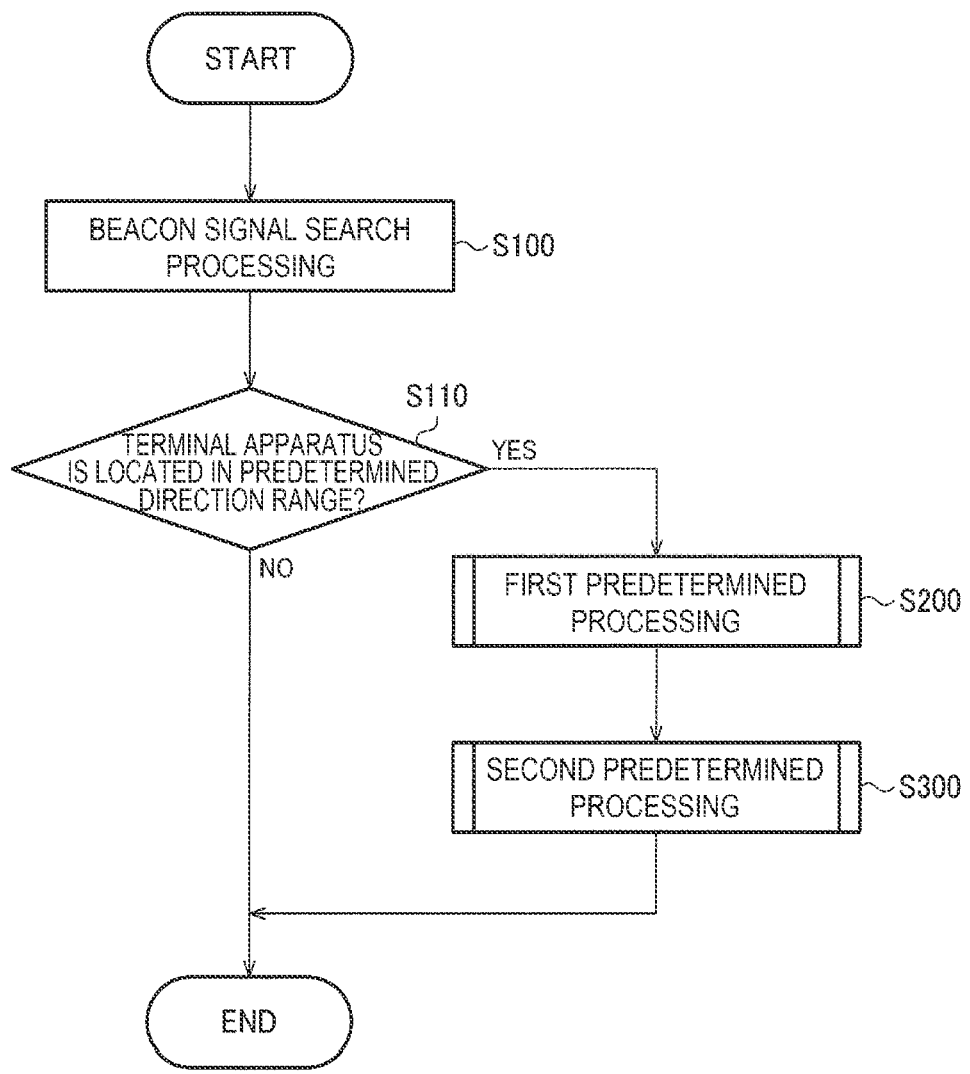
FIG. 11 is a flowchart for explaining another processing example in the embodiment.

The above explanation is a processing example in which the user information and the functions that the user desires to use are stored in the first predetermined table in association with each other in advance and the processing unit 130 selects a function using the first predetermined table. However, the processing example may be changed to a processing example in which the processing unit 130 predicts and selects a function that the user desires to use. Specifically, for example, when the electronic equipment 100 further includes the storage unit 150 as illustrated in a block diagram of FIG. 10 and the processing example is changed to a processing example illustrated in a flowchart of FIG. 11, the processing unit 130 can determine a function that the user desires to use. FIG. 11 is different from FIG. 2 in that, after performing the first predetermined processing (step S200), the processing unit 130 further performs second predetermined processing (step S300) and ends a flow.

As explained in detail below, use history information of the user, use frequency information of the user, or the like is stored in the storage unit 150 in association with the user information. A function used by the user is overwritten and stored every time the second predetermined processing (step S300) is performed, whereby the use history information, the use frequency information, or the like of the user is updated. That is, the electronic equipment 100 in this embodiment further includes the storage unit 150. The processing unit 130 performs processing for storing, in the storage unit 150, the use history information of the user or the use frequency information of the user and the user information in association with each other. Accordingly, the processing unit 130 can perform appropriate display processing based on the use history information or the use frequency information.

Figures 12, 13:
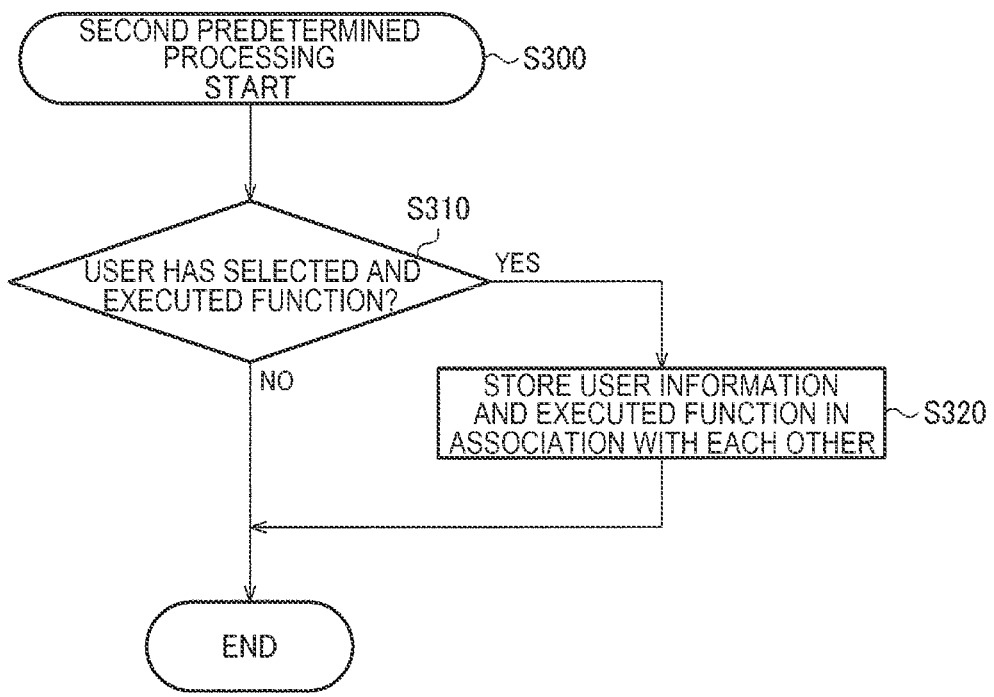
FIG. 12 is a flowchart for explaining a processing example of second predetermined processing.
FIG. 13 is a diagram for explaining use history information.

The second predetermined processing (step S300) is explained more in detail with reference to a flowchart of FIG. 12. The processing unit 130 performs processing for determining whether the user has selected and executed a function (step S310). When determining that the user has selected and executed a function (YES in step S310), the processing unit 130 performs processing for storing the function executed by the user and the user information in association with each other (step S320) and ends a flow. For example, a table indicated by C10 in FIG. 13 is stored in the storage unit 150 as the use history information and the processing unit 130 performs processing for updating the table indicated by C10. The table indicated by C10 includes date and time information indicated by C11, user information indicated by C12, and information concerning a function indicated by C13. The table illustrated in FIG. 13 is an illustration and various modified implementations are possible. For example, as explained above, C12 may be the identification information or the like of the terminal apparatus 200 if the user can be uniquely identified. On the other hand, when failing in determining that the user has selected and executed a function (NO in step S310), the processing unit 130 ends the flow. In step S222 performed again, for example, the processing unit 130 performs processing for querying about a function used by the first user M1 in the table indicated by C10. Consequently, it is seen that the first user M1 has been using the FAX function. Therefore, in step S222, the processing unit 130 predicts that a function corresponding to the user information of the first user M1 is the FAX function and selects the FAX function. Similarly, in step S222, the processing unit 130 predicts and selects the scan function as a function corresponding to user information of the second user M2. In this way, in the electronic equipment 100 in this embodiment, the processing unit 130 performs the processing for selecting the function screen as the display screen based on the use history information that is information concerning a history of the user using the functions of the electronic equipment 100. Accordingly, the processing unit 130 can predict a function of the electronic equipment 100 to be used by the user. According to step S224 following step S222, the processing unit 130 performs processing for displaying, on the display unit 160, a display screen of content based on the use history information that is information concerning a history of the user using the functions of the electronic equipment 100. Accordingly, it is possible to increase possibility that a function shown on a displayed screen and a function that the user actually desires to use coincide.

For example, a table indicated by C20 in FIG. 14 may be stored in the storage unit 150 as the use frequency information. The processing unit 130 may further perform processing for updating the use frequency information of the user in the second predetermined processing (step S300). The table indicated by C20 includes, for example, a column of user information indicated by C21, a column of a function indicated by C22, a column of a use frequency indicated by C23, and a column of a priority level indicated by C24. Functions used by users and use frequencies are associated for each of the users. The frequency level indicated by C24 relates to a level of a use frequency. For example, since the second user M2 uses the copy function at a frequency of ten times a month, uses the FAX function at a frequency of five times a month, and uses the scan function at a frequency of twenty times a month, a priority level of the scan function used at the highest frequency displayed on a display screen is set to the highest "1". Similarly, a priority level of the copy function is set as "2" and a priority level of the FAX function is set as "3".

The processing unit 130 performs processing for updating the use frequency information in the second predetermined processing (step S300) at certain timing, whereby the priority level is also updated. When the processing illustrated in FIG. 11 is started again and the processing in step S222 is performed, the processing unit 130 performs processing for predicting that the scan function, the priority level of which is "1", is a function to be used by the user and selecting the scan function. In the next step S224, the processing unit 130 performs processing for displaying a function screen of the selected scan function, the priority level of which is "1". As explained above, in the electronic equipment 100 in this embodiment, the processing unit 130 performs the processing for displaying, on the display unit 160, the display screen of the content based on the use frequency information that is the information concerning the frequency of the user using the functions of the electronic equipment 100. Accordingly, the electronic equipment 100 can display, to a user using a plurality of functions, a function screen that is highly likely to be used by the user.

In the second predetermined processing (step S300), the processing unit 130 may further perform processing for storing a function that the user used last in the electronic equipment 100. For example, as indicated by C25, the table indicated by C20 includes a column indicating a function used by the user last. Every time the second predetermined processing (step S300) is performed, the processing unit 130 performs processing for updating the function used by the user last. For example, it is assumed that, according to the second predetermined processing (step S300) at certain timing, the first user M1 uses the copy function at a frequency of twenty-five times a month, uses the FAX function at a frequency of twenty-five times a month, and uses the FAX function last. In this case, as illustrated in FIG. 14, priority levels of both of the copy function and the FAX function are set to "1". The processing in FIG. 11 is started again and, when the processing in step S222 is performed, the processing unit 130 performs processing for selecting the FAX function that is a function used last, the priority level of which is "1".

The processing unit 130 may update the use period information besides the use frequency information in the second predetermined processing (step S300) explained above and may perform the processing in step S222 based on the use frequency information and the use period information. The use period information is stored, in the storage unit 150, as, for example, a table indicated by C30 in FIG. 15. The table indicated by C30 is a table in which, for example, use situations of the electronic equipment 100 in the nearest four months are tabulated for each of users. The table indicated by C30 includes a column of user information indicated by C31, a column of a period indicated by C32, and a column of the number of times of use for each of functions indicated by C33. "The nearest four months" is only an illustration and can be changed as appropriate.

For example, as indicated by C34, it is seen that the first user M1 uses the copy function in September and October but does not use the copy function in November and December. As indicated by C35, it is seen that the first user M1 uses the FAX function at a frequency of ten times/month in September, at a frequency of twenty times/month in October, at a frequency of thirty time/month in November, and at a frequency of forty times/month in December. That is, both of a use frequency of the copy function and a use frequency of the FAX function of the first user M1 are twenty-five times/month. However, when use situations in the nearest two months are further considered, it is predicted that the first user M1 will use the FAX function in future. Consequently, when determining in step S110 that the terminal apparatus 200 of the first user M1 is located in the predetermined direction range, the processing unit 130 performs, in step S222, processing for predicting and selecting the FAX function. As explained above, in the electronic equipment 100 in this embodiment, the use frequency information is information concerning a use frequency in a nearest period among use periods of the electronic equipment 100. Consequently, the processing unit 130 can perform display processing more appropriately utilizing the use frequency information.

In FIGS. 6 to 8, an example is explained in which the menu screen is changed to the function screen showing the functions relating to the icons displayed on the menu screen. However, a display form of the menu screen may be changed. For example, when the first user M1 is located within the predetermined direction range indicated by A1, the processing unit 130 may perform processing for changing the screen indicated by B0 in FIG. 6 and the like to a screen indicated by D10 in FIG. 16. Specifically, for example, as indicated by D11, the processing unit 130 performs processing for changing a form of the icon indicating the FAX function. Accordingly, since the icon indicating the FAX function is displayed more conspicuously than the other icons, the first user M1 can quickly find the icon D11. Therefore, the first user M1 can easily select a desired icon.

Figure 17:
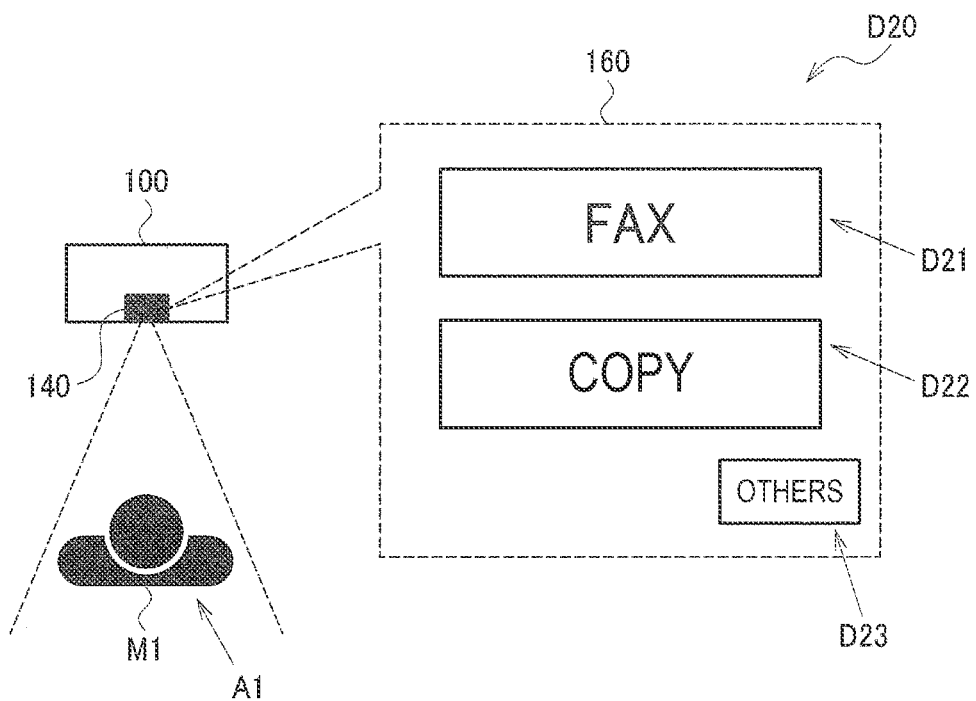
FIG. 17 is a diagram for explaining another display example to which the method in the embodiment is applied.

For example, when the first user M1 is located within the predetermined direction range indicated by A1, the processing unit 130 may perform processing for changing the screen indicated by B0 in FIG. 6 and the like to a screen indicated by D20 in FIG. 17. Specifically, for example, the processing unit 130 enlarges the icon indicating the FAX function as indicated by D21 and enlarges the icon indicating the copy function as indicated by D22. When the first user M1 selects an icon indicated by D23, although not illustrated, a screen showing an icon of a function different from the FAX function and the copy function is displayed. This is because, for example, as illustrated in FIG. 14, since the first user M1 is not using the functions other than the FAX function and the copy function, the icon of the FAX function indicated by D21 and the icon of the copy function indicated by D22 only have to be displayed on the display unit 160 conspicuously. Consequently, the first user M1 can easily select a desired icon.

Figure 18:
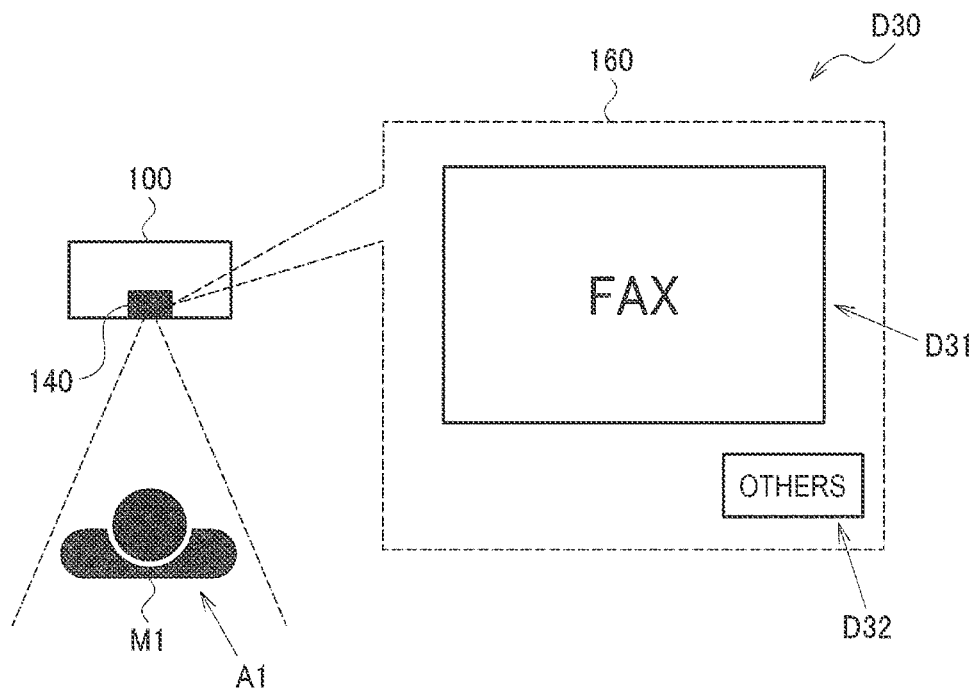
FIG. 18 is a diagram for explaining another display example to which the method in the embodiment is applied.

For example, when the first user M1 is located within the predetermined direction range indicated by A1, the processing unit 130 may perform processing for changing the screen indicated by B0 in FIG. 6 and the like to a screen indicated by D30 in FIG. 18. Specifically, for example, the processing unit 130 enlarges the icon indicating the FAX function as indicated by D31. When the first user M1 selects an icon indicated by D32, although not illustrated, a screen showing an icon of a function other than the FAX function is displayed. As explained above with reference to FIGS. 14 and 15, the first user M1 is considered to be highly likely to use the FAX function. Therefore, by enlarging and displaying the icon relating to the FAX function that is the function most highly likely to be used, it is possible to improve the convenience of the electronic equipment 100.

Figure 19:
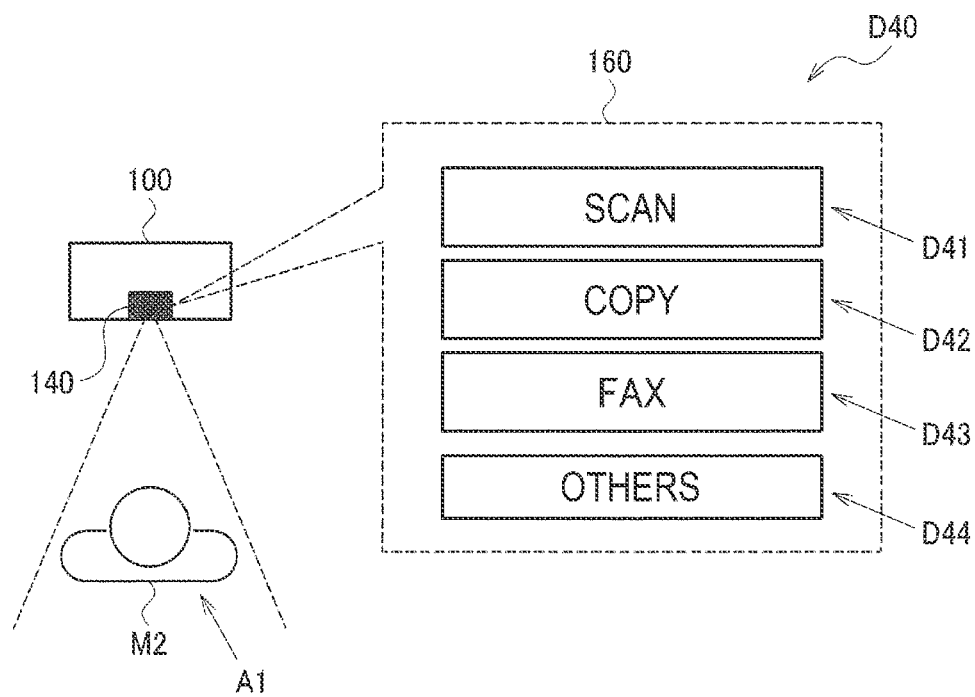
FIG. 19 is a diagram for explaining another display example to which the method in the embodiment is applied.

For example, when the second user M2 is located within the predetermined direction range indicated by A1, the processing unit 130 may perform processing for changing the screen indicated by B0 in FIG. 6 and the like to a screen indicated by D40 in FIG. 19. Specifically, for example, an icon indicating the scan function as indicated by D41, an icon indicating the copy function as indicated by D42, an icon indicating the FAX function as indicated by D43, and an icon indicated by D44 are displayed. The icons D41 to D43 are displayed to be disposed from the top in descending order of use frequencies based on, for example, the table indicated by C20 in FIG. 14. Consequently, the second user M2 can easily find an icon relating to a desired function by viewing the icons in order from the top of the screen. When the second user M2 selects the icon indicated by D44, although not illustrated, a screen showing an icon of a function different from the scan function, the copy function, and the FAX function is displayed.

Figure 20:
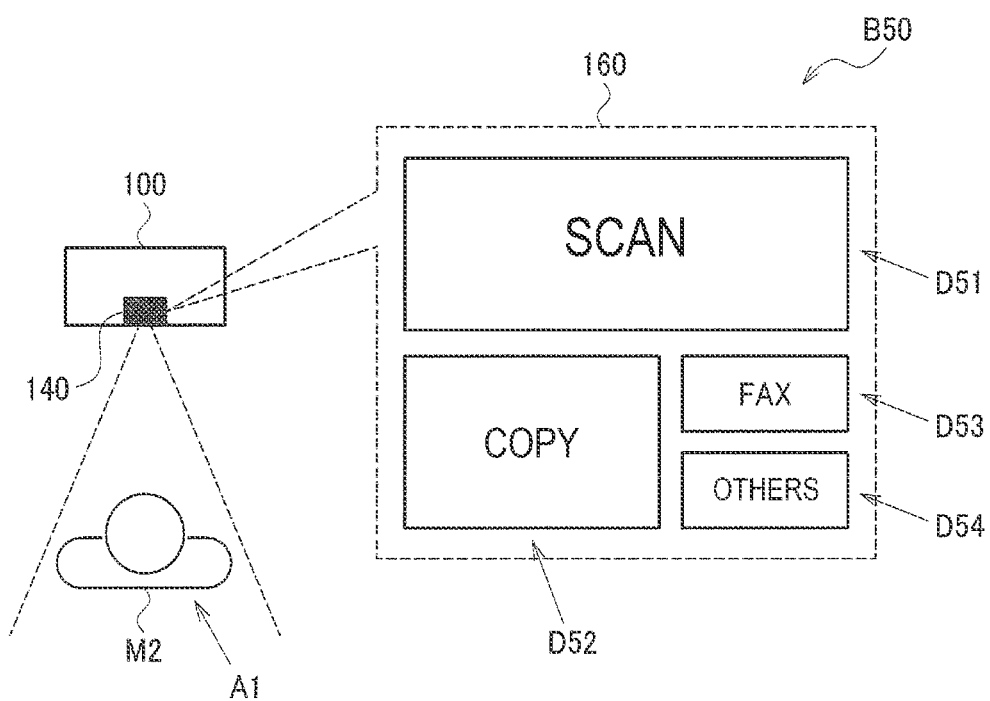
FIG. 20 is a diagram for explaining another display example to which the method in the embodiment is applied.

For example, when the second user M2 is located within the predetermined direction range indicated by A1, the processing unit 130 may perform processing for changing the screen indicated by B0 in FIG. 6 and the like to a screen indicated by D50 in FIG. 20. Specifically, for example, an icon indicating the scan function as indicated by D51, an icon indicating the copy function as indicated by D52, an icon indicating the FAX function as indicated by D53, and an icon indicated by D54 are displayed. Areas of the icons D51 to D53 are displayed to change according to the priority levels explained above with reference to FIG. 14. That is, for example, the icon relating to the scan function that is the function, the priority level of which is 1, is displayed largest as indicated by D51. Consequently, the second user M2 can easily find an icon relating to a desired function.

Figure 21:
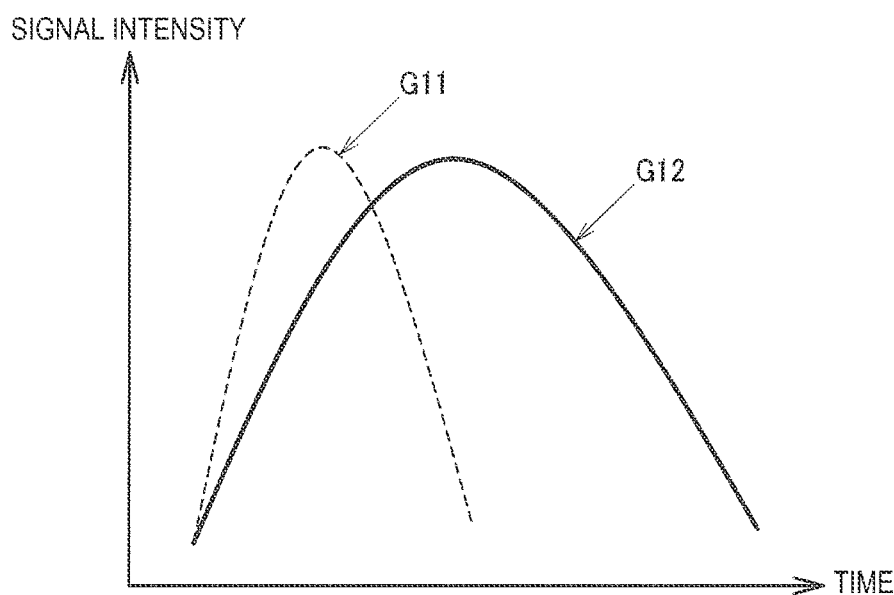
FIG. 21 is a diagram for explaining an example of a temporal change of signal intensity.

For example, the processing unit 130 may perform processing further considering an intensity change amount of a beacon signal besides the direction information. For example, it is assumed that a not-shown third user crossing the front of the electronic equipment 100 and a not-shown fourth user approaching the electronic equipment 100 in order to use the electronic equipment 100 are present. In this case, behaviors of signal intensity of a beacon signal advertised by the terminal apparatus 200 carried by the third user and signal intensity of a beacon signal advertised by the terminal apparatus 200 carried by the fourth user are different. Specifically, for example, the third user passes the front of the electronic equipment 100 without reducing speed but the fourth user approaches the electronic equipment 100 while reducing speed in order to perform predetermined work in the front of the electronic equipment 100. Therefore, the signal intensity of the beacon signal advertised by the terminal apparatus 200 carried by the third user changes as indicated by G11 in FIG. 21 and the signal intensity of the beacon signal advertised by the terminal apparatus 200 carried by the fourth user changes as indicated by G12 in FIG. 21. Consequently, the processing unit 130 can determine, based on a behavior of signal intensity of a beacon signal, whether the received beacon signal is a beacon signal transmitted from the terminal apparatus 200 carried by the third user. Although not illustrated in the flowchart, when determining, based on the behavior of the signal intensity of the beacon signal, that the received beacon signal is the beacon signal transmitted from the terminal apparatus 200 of the third user, the processing unit 130 may not perform the first predetermined processing (step S200) and the like explained above. This is because, since the third user does not use the electronic equipment 100, the processing unit 130 does not need to perform the first predetermined processing (step S200).

Figure 22:
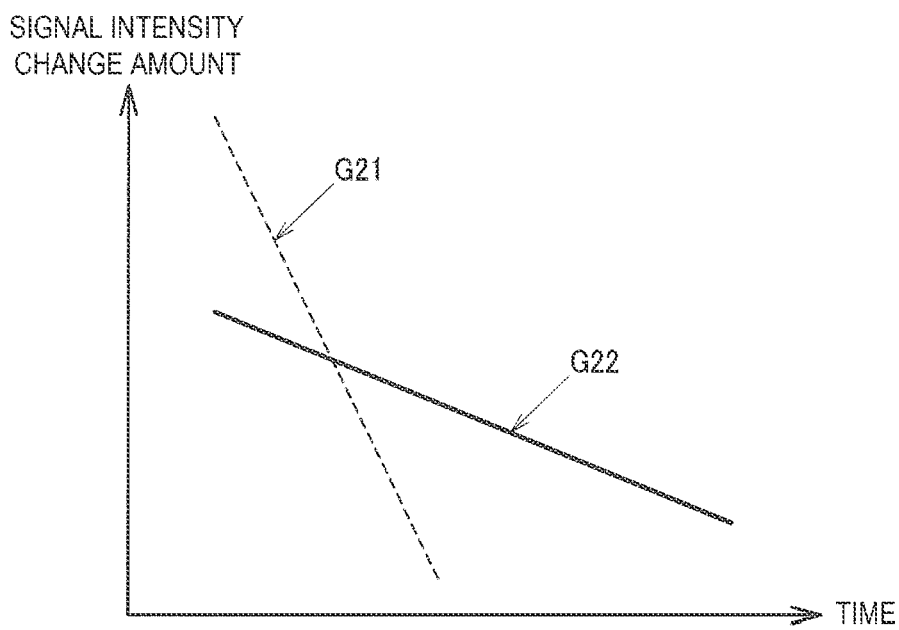
FIG. 22 is a diagram for explaining an example of a temporal change of a signal intensity change amount.

The processing unit 130 may perform processing for calculating a change amount of signal intensity and determining, based on the change amount, whether the received beacon is the beacon signal transmitted from the terminal apparatus 200 carried by the third user. For example, when graphs indicated by G11 and G12 in FIG. 21 can be approximated to quadratic curves, the quadratic curves are differentiated by time to be changed to straight lines indicated by G21 and G22 in FIG. 22. When the straight line of G21 and the straight line of G22 are compared, it is seen that a gradient of the straight line of G21 is larger. Consequently, for example, the processing unit 130 may perform processing for calculating a signal intensity change amount illustrated in FIG. 22 based on the signal intensity of the received beacon signal and, when a gradient of a straight line indicating the signal intensity change amount is larger than predetermined magnitude, determine that the received beacon signal is the beacon signal transmitted from the terminal apparatus 200 of the third user. As explained above, in the electronic equipment 100 in this embodiment, when determining that the terminal apparatus 200 is located in the predetermined direction range, the processing unit 130 performs processing for determining, based on a change amount of signal intensity of a beacon signal of wireless communication, whether a display screen is displayed on the display unit 160. Accordingly, the processing unit 130 can perform display processing after determining whether the third user is a user who uses the electronic equipment 100.

As explained above, an electronic equipment in this embodiment wirelessly communicates with a terminal apparatus through a wireless communication unit and includes a direction-information acquiring unit and a processing unit. The direction-information acquiring unit acquires, through wireless communication with the terminal apparatus by the wireless communication unit, direction information concerning a direction of the terminal apparatus with respect to a reference position of the electronic equipment. When determining based on the direction information that the terminal apparatus is located in a predetermined direction range, the processing unit performs a processing for displaying, on a display unit, a display screen based on user information of a user of the terminal apparatus.

Accordingly, when the user reaches the front of the electronic equipment, the user can view a desired display screen different from a menu screen. Consequently, it is possible to improve convenience of the electronic equipment.

When the terminal apparatus is located in the predetermined direction range and a predetermined distance range that is a range of a predetermined distance, the processing unit may perform processing for displaying, on the display unit, the display screen based on the user information.

Accordingly, it is possible to set the predetermined direction range in a more appropriate range.

The reference position may be a position of an operation unit, and the predetermined direction range may be a range including a front direction from the operation unit.

Accordingly, the processing unit can perform processing for displaying, based on direction information based on a front side of the operation unit, on the display unit, the display screen based on the user information.

When the electronic equipment has a plurality of functions, the processing unit may perform processing for displaying, on the display unit, as the display screen, a function screen corresponding to the user information among function screens corresponding to the plurality of functions.

Accordingly, when the electronic equipment has the plurality of functions, the user can view a desired display screen different from the menu screen.

The processing unit may perform processing for selecting the function screen as the display screen based on use history information that is information concerning a history of the user using the functions of the electronic equipment.

Accordingly, the processing unit can predict a function of the electronic equipment to be used by the user.

The functions in this embodiment may include at least one of a printing function, a FAX function, a scan function, and a copy function.

Accordingly, the user can use at least one of the printing function, the FAX function, the scan function, and the copy function of the electronic equipment.

The processing unit may perform processing for displaying, on the display unit, the display screen of content based on use history information that is information concerning a history of the user using functions of the electronic equipment.

Accordingly, it is possible to increase possibility that a function relating to the display screen and a function that the user actually desires to use coincide.

The processing unit may perform processing for displaying, on the display unit, the display screen of content based on use frequency information that is information concerning a frequency of the user using functions the electronic equipment.

Accordingly, the electronic equipment can display, to the user using a plurality of functions, a function screen that the user is highly likely to use.

The use frequency information may be information concerning a use frequency in a nearest period among use periods of the electronic equipment.

Accordingly, the processing unit can perform display processing more appropriately utilizing the use frequency information.

The electronic equipment may further include a storage unit, and the processing unit may perform processing for storing, in the storage unit, use history information of the user or use frequency information of the user and the user information in association with each other.

Accordingly, the processing unit can perform appropriate display processing based on the use history information or the use frequency information.

The user information may be at least one of identification information of the terminal apparatus or a user ID.

Accordingly, it is possible to appropriately specify a user corresponding to a display screen that should be displayed on the display unit.

When determining that the terminal apparatus and another terminal apparatus are located in the predetermined direction range, the processing unit may perform processing for displaying, on the display unit, the display screen based on the user information of the terminal apparatus closer to the electronic equipment.

Accordingly, when a plurality of terminal apparatuses are located in the predetermined direction range, the processing unit can display an appropriate function screen.

When determining that the terminal apparatus is located in the predetermined direction range, the processing unit may perform processing for determining, based on a change amount of signal intensity of a beacon signal of wireless communication, whether to display the display screen on the display unit.

Accordingly, the processing unit can perform the display processing after determining whether the user is a user who uses the electronic equipment.

The direction-information acquiring unit may acquire the direction information based on the wireless communication conforming to a Bluetooth standard.

Accordingly, it is possible to construct a system that controls display of the electronic equipment using Bluetooth.

A processing method in this embodiment performs: wireless communication processing for wirelessly communicating with a terminal apparatus; processing for acquiring, through the wireless communication processing, direction information concerning a direction of the terminal apparatus with respect to a reference position of electronic equipment; and processing for, when determining based on the direction information that the terminal apparatus is located in a predetermined direction range, performing processing for displaying, on a display unit, a display screen based on user information of a user of the terminal apparatus.

A non-transitory computer-readable storage medium stores a program for causing a computer to function as: a wireless communication unit configured to wirelessly communicate with a terminal apparatus; a direction-information acquiring; and a processing unit. The direction-information acquiring unit acquires, through the wireless communication with the terminal apparatus by the wireless communication unit, direction information concerning a direction of the terminal apparatus with respect to a reference position of electronic equipment. When determining based on the direction information that the terminal apparatus is located in a predetermined direction range, the processing unit performs processing for displaying, on a display unit, a display screen based on user information of a user of the terminal apparatus.

The embodiment is explained in detail above. However, those skilled in the art could easily understand that many modifications not substantively departing from the new matters and the effects of the embodiment are possible. Therefore, all such modifications are deemed to be included in the scope of the present disclosure. For example, terms described together with broader or synonymous different terms at least once in the specification or the drawings can be replaced with the different terms in any part of the specification and the drawings. All combinations of the embodiment and the modifications are also included in the scope of the present disclosure. Configurations and operations of the electronic equipment, the processing method, the non-transitory computer-readable storage medium storing the program, and the like are not limited to those explained in the embodiment and various modified implementations are possible.

What is claimed is:

1. An electronic equipment that wirelessly communicates with a terminal apparatus through a wireless communication unit, the electronic equipment comprising:
    one or more processor; and
    a memory including instructions that, when executed by the one or more processors, cause the electronic equipment to function as:
    a direction-information acquiring unit configured to acquire, through wireless communication with the terminal apparatus by the wireless communication unit, direction information concerning a direction of the terminal apparatus with respect to a reference position of the electronic equipment; and
    a processing unit configured to, when determining based on the direction information that the terminal apparatus is located in a predetermined direction range, perform processing for displaying, on a display, a display screen based on user information of a user of the terminal apparatus, wherein,
    when determining that the terminal apparatus is located in the predetermined direction range, the processing unit performs processing for determining, based on a rate of a change amount of signal intensity of a beacon signal of wireless communication, whether to display the display screen on the display.

2. The electronic equipment according to claim 1, wherein, when the terminal apparatus is located in the predetermined direction range and a predetermined distance range that is a range of a predetermined distance, the processing unit performs processing for displaying, on the display, the display screen based on the user information.

3. The electronic equipment according to claim 1, wherein
    the reference position is a position of an operation unit, and
    the predetermined direction range is a range including a front direction from the operation unit.

4. The electronic equipment according to claim 1, wherein, when the electronic equipment has a plurality of functions, the processing unit performs processing for displaying, on the display, as the display screen, a function screen corresponding to the user information among function screens corresponding to the plurality of functions.

5. The electronic equipment according to claim 4, wherein the processing unit performs processing for selecting the function screen as the display screen based on use history information that is information concerning a history of the user using the functions of the electronic equipment.

6. The electronic equipment according to claim 4, wherein the functions include at least one of a printing function, a FAX function, a scan function, and a copy function.

7. The electronic equipment according to claim 1, wherein the processing unit performs processing for displaying, on the display, the display screen of content based on use history information that is information concerning a history of the user using functions of the electronic equipment.

8. The electronic equipment according to claim 1, wherein the processing unit performs processing for displaying, on the display, the display screen of content based on use frequency information that is information concerning a frequency of the user using functions of the electronic equipment.

9. The electronic equipment according to claim 8, wherein the use frequency information is information concerning a use frequency in a nearest period among use periods of the electronic equipment.

10. The electronic equipment according to claim 1, further comprising a storage, wherein
the processing unit performs processing for storing, in the storage, use history information of the user or use frequency information of the user and the user information in association with each other.

11. The electronic equipment according to claim 1, wherein the user information is at least one of identification information of the terminal apparatus or a user ID.

12. The electronic equipment according to claim 1, wherein, when determining that the terminal apparatus and another terminal apparatus are located in the predetermined direction range, the processing unit performs processing for displaying, on the display, the display screen based on the user information of the user relating to the terminal apparatus closer to the electronic equipment.

13. The electronic equipment according to claim 1, wherein the direction-information acquiring unit acquires the direction information based on the wireless communication conforming to a Bluetooth standard.

14. The electronic equipment according to claim 1, wherein, the display screen includes graphical representations of functions, and
areas of the graphical representations are displayed based on use history information that is information concerning a history of the user using the functions of the electronic equipment.

15. A processing method for performing:
wireless communication processing for wirelessly communicating with a terminal apparatus;
processing for acquiring, through the wireless communication processing, direction information concerning a direction of the terminal apparatus with respect to a reference position of electronic equipment; and
processing for, when determining based on the direction information that the terminal apparatus is located in a predetermined direction range, performing processing for displaying, on a display, a display screen based on user information of a user of the terminal apparatus, wherein,
when determining that the terminal apparatus is located in the predetermined direction range, it is performed processing for determining, based on a rate of a change amount of signal intensity of a beacon signal of wireless communication, whether to display the display screen on the display.

16. A non-transitory computer-readable storage medium storing a program for causing a computer to function as:
a wireless communication unit configured to wirelessly communicate with a terminal apparatus;
a direction-information acquiring unit configured to acquire, through the wireless communication with the terminal apparatus by the wireless communication unit, direction information concerning a direction of the terminal apparatus with respect to a reference position of electronic equipment; an
a processor configured to, when determining based on the direction information that the terminal apparatus is located in a predetermined direction range, perform processing for displaying, on a display, a display screen based on user information of a user of the terminal apparatus, wherein,
when determining that the terminal apparatus is located in the predetermined direction range, the processing unit performs processing for determining, based on a rate of a change amount of signal intensity of a beacon signal of wireless communication, whether to display the display screen on the display.

* * * * *